(12) United States Patent
Demandolx et al.

(10) Patent No.: US 8,351,736 B2
(45) Date of Patent: Jan. 8, 2013

(54) AUTOMATIC DUST REMOVAL IN DIGITAL IMAGES

(75) Inventors: Denis Demandolx, Redmond, WA (US); Eric Paul Bennett, Kirkland, WA (US); Antonio Criminisi, Cambridge (GB); Vladimir Farbman, Jerusalem (IL); Steven James White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 12/476,514

(22) Filed: Jun. 2, 2009

(65) Prior Publication Data

US 2010/0303380 A1    Dec. 2, 2010

(51) Int. Cl.
   *G06K 9/40*  (2006.01)
   *G06T 5/00*  (2006.01)
(52) U.S. Cl. ......................... 382/275; 358/3.26
(58) Field of Classification Search .............. 382/275
   See application file for complete search history.

(56) References Cited

U.S. PATENT DOCUMENTS

| | | | | |
|---|---|---|---|---|
| 5,641,596 A * | 6/1997 | Gray et al. | ...... | 430/21 |
| 6,393,160 B1 * | 5/2002 | Edgar | ...... | 382/275 |
| 6,683,995 B2 * | 1/2004 | Ford et al. | ...... | 382/275 |
| 6,711,302 B1 * | 3/2004 | Lee | ...... | 382/275 |
| 6,987,892 B2 * | 1/2006 | Edgar | ...... | 382/254 |
| 6,990,252 B2 * | 1/2006 | Shekter | ...... | 382/276 |
| 7,088,870 B2 | 8/2006 | Perez et al. | | |
| 7,206,461 B2 | 4/2007 | Steinberg et al. | | |
| 7,369,712 B2 | 5/2008 | Steinberg et al. | | |
| 7,982,743 B2 * | 7/2011 | Cooper et al. | ...... | 345/581 |
| 8,023,567 B2 * | 9/2011 | Gomila et al. | ...... | 375/240.26 |
| 2006/0133686 A1 * | 6/2006 | Gomila et al. | ...... | 382/254 |
| 2008/0304764 A1 | 12/2008 | Lin et al. | | |

OTHER PUBLICATIONS

Chang, et al. "Application of Inpainting Technology to Video Restoration", Retrieved at<<http://ieeexplore.ieee.org/stamp/stamp.jsp?tp=&arnumber=4570917&isnumber=4570856>>, 2008 IEEE, pp. 359-364.

(Continued)

*Primary Examiner* — Jason M Repko
*Assistant Examiner* — Patrick Edwards
(74) *Attorney, Agent, or Firm* — Capitol City TechLaw; Richard C. Irving

(57) ABSTRACT

Methods and a processing device are provided for restoring pixels damaged by artifacts caused by dust, or other particles, entering a digital image capturing device. A user interface may be provided for a user to indicate an approximate location of an artifact appearing in a digital image. Dust attenuation may be estimated and an inverse transformation, based on the estimated dust attenuation, may be applied to damaged pixels in order to recover an estimate of the underlying digital image. One or many candidate source patch may be selected based on having smallest pixel distances, with respect to a target patch area. The damaged pixels included in the target patch area may be considered when calculating the pixel distance with respect to candidate source patches. RGB values of corresponding pixels of source patches may be used to restore the damaged pixels included in the target patch area.

20 Claims, 7 Drawing Sheets

OTHER PUBLICATIONS

Bergman, et al. "Comprehensive Solutions for Removal of Dust and Scratches from Images ", Retrieved at<<http://www.hpl.hp.com/techreports/2007/HPL-2007-20.pdf>>, Feb. 6, 2007, pp. 26.

Bertalmio, et al. "Image Inpainting ", Retrieved at<<http://www.iua.upf.es/~mbertalmio/bertalmi.pdf>>, pp. 1-8.

"Photo Cleanup ", Retrieved at<<http://photocleanup.smugmug.com/gallery/6927932_PSYHM>>, pp. 5.

Forbin, et al. "Temporal Extension to Exemplar-Based Inpainting Applied to Scratch Correction in Damaged Image Sequences ", Retrieved at<<http://prestospace.org/training/images/viip2005.pdf>>, pp. 1-5.

Criminisi, et al. "Region Filling and Object Removal by Exemplar-Based Image Inpainting", Sep. 2004, IEEE Transactions on Image Processing, vol. 13, No. 9, pp. 1200-1212.

* cited by examiner

AUTOMATIC DUST REMOVAL IN DIGITAL IMAGES

BACKGROUND

Some digital cameras have interchangeable lenses. When changing a lens on such a digital camera, dust particles can enter a space between the lens and an optical low-pass filter positioned on top of a sensor. The dust particles inhibit light from reaching the sensor resulting in artifacts, which appear as dark spots on a digital image. A user usually does not realize that a digital image is contaminated by dust particles until sometime after the digital image is captured, which is too late for the user to do anything about the contamination for the already-captured digital image. Techniques are known for physically cleaning the dust particles from the sensor. However, physically cleaning the dust from the sensor is difficult and, if one is not careful, the sensor may become damaged.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first embodiment consistent with the subject matter of this disclosure, a user interface may be provided, such that a user may indicate an approximate location of an artifact appearing in a digital image. In some embodiments the user interface may permit the user to provide an approximate size of the artifact. After receiving the user input, parameters of a dust attenuation field may be estimated and an inverse transformation of the dust attenuation field may be applied to pixels in an approximate location of the artifact in order to photometrically adjust the pixels. To complement the above-mentioned method for photometrically adjusting the pixels, in some embodiments a target patch area, which includes pixels damaged by the artifact and undamaged pixels, may be selected and a pixel distance function may be applied to the selected target patch area and each of a number of candidate source patches. At least one candidate source patch may be selected based, at least in part, on a pixel distance determined by the pixel distance function. Damaged pixels of the target patch area may be restored based on corresponding pixels of the at least one selected candidate source patch.

In a second embodiment, a user interface may be provided to permit a user to provide an indication of an approximate location of an artifact in a digital image. An approximate size of the artifact may be estimated and a target patch area may be selected from a number of target patch areas. The selected target patch area includes at least some pixels damaged by the artifact and other undamaged pixels with known values. One or more candidate source patches may be selected based on a pixel distance function applied to the selected target patch area and each candidate source patch. Attenuation may be estimated based on values of pixels in the selected target patch area and corresponding pixels of the one or more candidate source patches. A median filter may be applied to improve the estimated attenuation. Applying an inverse of the improved estimated attenuation may recover at least some structure of the underlying digital image. When damaged pixels are mildly attenuated, application of the inverse of the improved estimated attenuation may be enough to recover the mildly attenuated pixels. Otherwise, another step may be performed, such as, for example, selecting a single candidate source patch and copying, or cloning, RGB values of pixels of the single candidate source patch to corresponding damaged pixels of the selected target patch area in order to restore the corresponding damaged pixels.

In a variation of the second embodiment, an attenuation field determined for another digital image captured by a same digital image capturing device used to capture the digital image may be used to restore values of damaged pixels.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
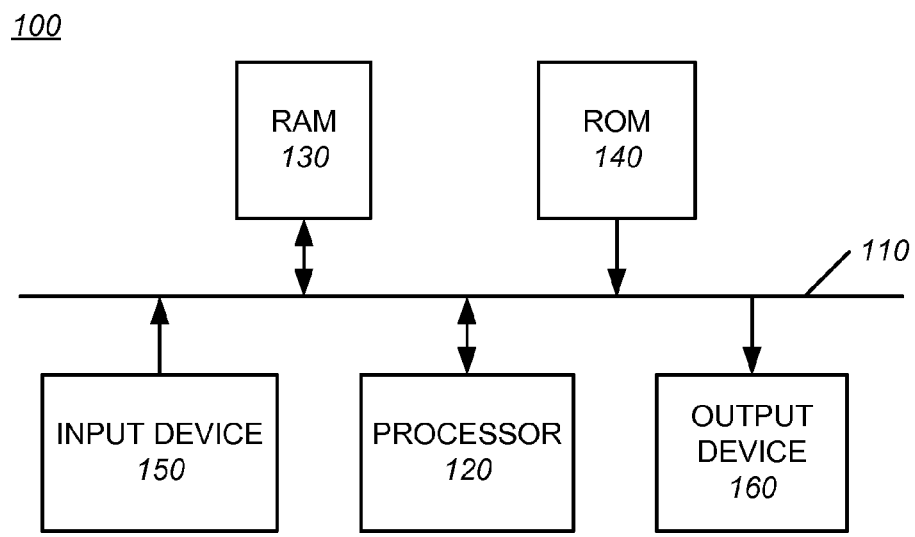
FIG. 1 is a block diagram of an exemplary processing device, which may be used to implement embodiments consistent with subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, methods and a processing device are disclosed that restore pixels of a digital image damaged by artifacts caused by dust or other particles entering a digital image capturing device such as, for example, a digital camera or other device.

In one embodiment, a user interface may be provided for a user to indicate an approximate location of an artifact appearing in a digital image. The artifact may be caused by dust or other particles that have entered a digital image capturing device. The user may indicate the approximate location of the artifact by using a pointing device to select a location at an approximate central portion of the artifact. The pointing device may be: a computer mouse; a trackball; a finger on a touchpad; a stylus, a finger or an electronic pen making contact with a touchscreen; keys on a keyboard; or other type of pointing device. In some embodiments, the user may indicate an approximate size of the artifact. For example, in an embodiment using a computer mouse, a scroll wheel of the mouse may be used to increase or decrease a user-indicated approximate size of the artifact. In other embodiments, other methods may be used to indicate an approximate size of the artifact.

After receiving user input indicating an approximate location of the artifact in the digital image and an approximate size of the artifact, parameters of a dust attenuation field may be estimated. An inverse transformation of the dust attenuation field may be applied to pixels at the approximate location of the artifact in order to recover at least a structure of the underlying digital image.

A target area may be segmented into a number of target patch areas. Each of the target patch areas may include undamaged pixels with known values and damaged pixels with unknown or corrupted values. One of the target patch areas may be selected and at least one candidate source patch may be selected based on a patch distance function applied to the selected one of the target patch areas and each of a number of candidate source patches. Values of the damaged pixels of the target patch area may be restored based on values of corresponding pixels of the at least one selected candidate source patch.

In a second embodiment, user input may be received indicating an approximate location of an artifact in a digital image. The artifact may be caused by dust or other particles that entered a digital image capturing device. An approximate size of the artifact may be estimated and a target patch area may be selected from a number of target patch areas, each of which include at least some pixels damaged by the artifact and pixels with known values. At least one candidate source patch may be selected based on a patch distance function applied to the selected one of the target patch areas and each of a number of candidate source patches. Attenuation may be estimated based on values of pixels in the selected one of the target patch areas and corresponding pixels of the at least one selected candidate source patch.

After estimating attenuation of pixels in all target patch areas, a median filter may be applied to the pixels to improve the estimated attenuation. An inverse of the estimated attenuation may be applied to damaged pixels of the target patch areas in order to recover at least some structure of the underlying digital image.

Pixels of the target patch areas may further be recovered by determining a candidate source patch for each of the target patch areas. Unrecoverable pixels may be defined as pixels that have been attenuated beyond a given threshold. Values of corresponding pixels of the determined candidate source patches may be copied to corresponding unrecoverable pixels in order to restore the unrecoverable pixels.

In a variation of the second embodiment, an attenuation field of another digital image captured by a same digital image capturing device may be employed to restore values of damaged pixels.

Exemplary Processing Device

FIG. 1 is a diagram of an exemplary processing device 100, which may be used to implement embodiments consistent with the subject matter of this disclosure. Processing device 100 may be a personal computer (PC), a handheld processing device, a digital image capturing device, including, but not limited to a digital camera, or another type of processing device. Processing device 100 may include a bus 110, a processor 120, a random access memory (RAM) 130, a read only memory (ROM) 140, an input device 150, and an output device 160. Bus 110 may connect processor 120, RAM 130, ROM 140 and output device 160.

Processor 120 may include one or more conventional processors that interpret and execute instructions, including, but not limited to a central processing unit (CPU) and a graphics processing unit (GPU). A memory may include RAM 130, ROM 140, and/or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120.

Input device 150 may include a keyboard, a pointing device, an electronic pen, a touchscreen, or other device for providing input. Output device 160 may include a display, a printer, or other device for outputting information.

Processing device 100 may perform functions in response to processor 120 executing sequences of instructions contained in a tangible machine-readable medium, such as, for example, RAM 130, ROM 140 or other medium. Such instructions may be read into RAM 130 from another tangible machine-readable medium or from a separate device via a communication interface (not shown).

Exemplary User Interface

Figure 2:
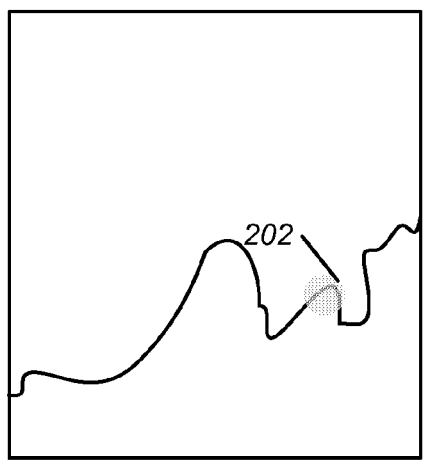
FIG. 2 illustrates an artifact appearing in an exemplary digital image.

FIG. 2 illustrates an exemplary a digital image 200 including an artifact 202, which may partially obscure an underlying portion of the digital image. A user may use a pointing device to indicate an approximate central location of the artifact in the digital image. For example, the user may use a computer mouse to position a cursor over a central portion of the artifact, may select a size of the artifact with a scroll wheel of the computer mouse, and may left-click the computer mouse. In other embodiments, the user may employ other pointing devices to indicate a location of the artifact and an approximate size of the artifact.

Figure 3:
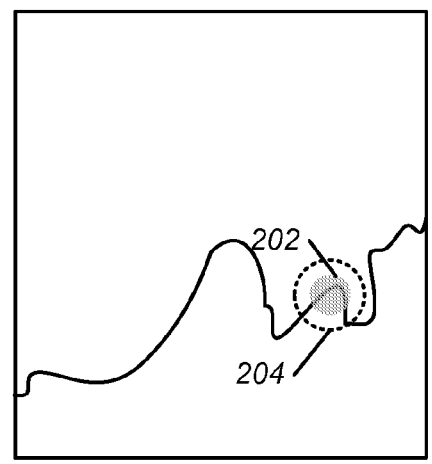
FIG. 3 illustrates an exemplary digital image having an artifact and an exemplary indication of a size of the artifact.

FIG. 3 illustrates artifact 202 with an indication 204 of an approximate size and location of the artifact. In FIG. 3, indication 204 is a dashed curved line. Although, in other embodiments, indication 204 may be a solid curved line or other visual indication. Further, indication 202 is shown as having a circular shape. However, in other embodiments, indication 202 may have a rectangular shape or other type of shape.

In some embodiments, a user may provide user input indicating only an approximate location of an artifact. The processing device may estimate a size of the artifact and may indicate the estimate of the size using an indication such as, for example, indication 202.

Figure 4:
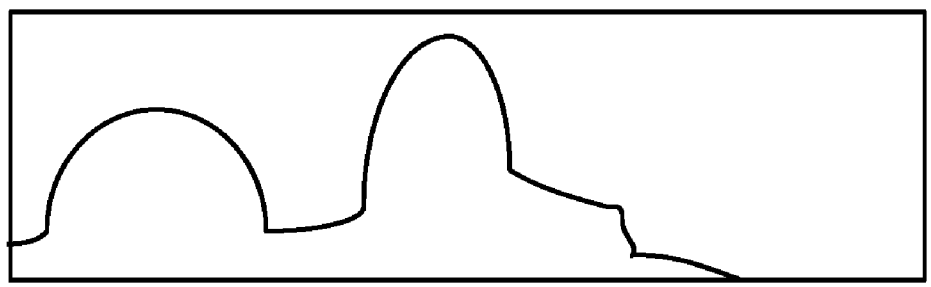
FIGS. 4 and 5 illustrate exemplary histograms which may be used to estimate parameters of a dust modeling function.
Figure 5:
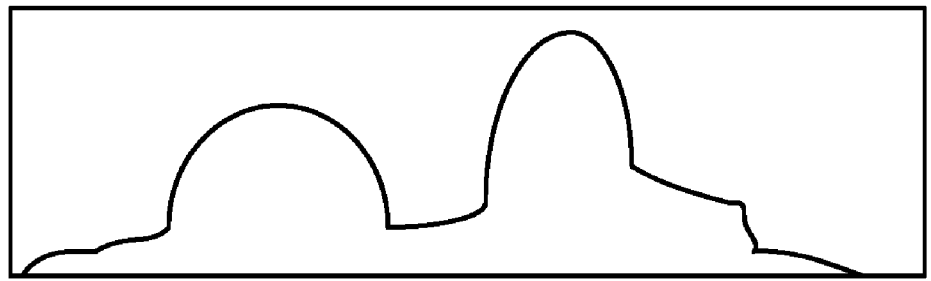

A distribution of red channel, green channel, and blue channel values of pixels within an area damaged by an artifact is different from a distribution of red channel, green channel, and blue channel values of pixels in an undamaged area, or band, surrounding the damaged area. FIG. 4 illustrates a histogram showing an exemplary distribution of red channel, green channel, and blue channel values of pixels in the area damaged by the artifact. FIG. 5 illustrates a histogram showing an exemplary distribution of red channel, green channel, and blue channel values of pixels in the undamaged area, or band, surrounding the damaged area. Both histograms are quite similar in shape and size. However, the histogram of FIG. 4 is shifted left due to darkening caused by the artifact.

An image formation model is as follows:

$$I(x)=I'(x)+D(x),$$

where I is a final digital image, x=(x, y) indicates a position of a pixel, I' indicates an underlying, unknown true image and D is dust. In an alternate embodiment, a multiplicative image formation model, such as, for example, $$I(x)=I'(x) \times D(x),$$

may be used.

In various embodiments, dust may be modeled as an isotropic two-dimensional Gaussian as follows:

$$D(x) = \alpha \exp(-(x-\mu)^2/(2\sigma^2)),$$

where $\mu$ is an offset that reflects a spatial position of the Gaussian distribution that is a location of a dust center, $\sigma$ is a standard deviation of the Gaussian distribution and reflects a size of an artifact caused by the dust, and $\alpha$ represents an intensity of dust attenuation. In some implementations, dust may be modeled as a two-dimensional non-isotropic Gaussian, which may not be axis aligned in some implementations.

In embodiments in which artifacts are caused by other types of particles, including, but not limited to, water droplets on a lens, a model different from the dust model $D(x)$ may be used.

Exemplary Processing

Figure 6:
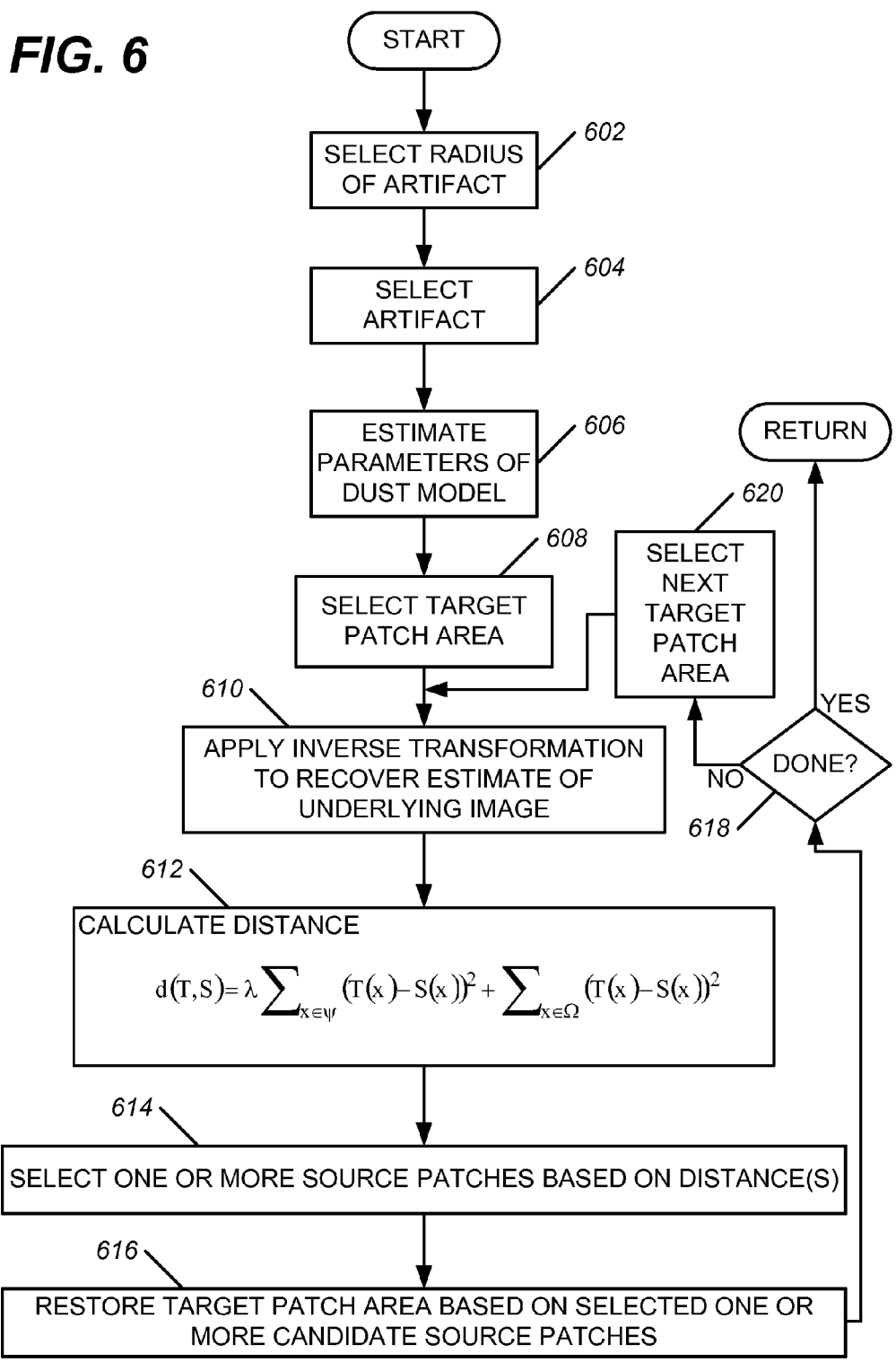
FIGS. 6-10 are flowcharts illustrating exemplary processing in various embodiments consistent with subject matter of this disclosure.

FIG. 6 is a flowchart illustrating exemplary processing in some embodiments consistent with the subject matter of this disclosure. The process may begin with a user of a processing device selecting a radius of an artifact appearing in a digital image (act 602). In an embodiment which includes a computer mouse, the user may use a scroll wheel of the computer mouse to select the radius. In other embodiments, other methods may be used to select a radius of an artifact. Next, the user may select the artifact (act 604). In the embodiment which includes the computer mouse, the user may select the artifact by left clicking the mouse with a cursor hovering over the artifact. In other embodiments, other methods may be used to select the artifact.

Next, the processing device may estimate parameters, $\alpha$, $\mu$, and $\sigma$ of a dust model, such as the dust model, $D(x)=\alpha \exp(-(x-\mu)^2/(2\sigma^2))$, previously described (act 606). Due to dust, a distribution of pixel values in a red channel, a green channel, and a blue channel of a damaged region and in a small surrounding region are different from one another. As previously discussed, with respect to FIGS. 4 and 5, a histogram of a damaged region is shifted left due to darkening. Therefore, the processing device may perform an exhaustive search for dust parameters $\alpha$, $\mu$, and $\sigma$, such that the histogram of the damaged region is as close as possible to a histogram of the small surrounding region. A distance between histograms may be computed as a sum of squared distances or Chi-squared distances. Distances between three histogram pairs, in the red channel, the green channel, and blue channel, may be averaged. To improve efficiency, an exhaustive search may be replaced with gradient descent and only negative values of $\alpha$, or values within a range of (0.0, 1.0] when using the multiplicative model (to model only darkening effects) may be considered in some embodiments. Further, in some embodiments, $\mu$ may not be estimated, but instead, may be assigned a value of a pixel location corresponding to a location selected by the user.

Next, the processing device may select a target patch area from among a number of target patch areas (act 608). A portion of the selected target patch area includes at least part of a damaged, or corrupted, region, $\psi$, and a remaining portion, $\Omega$, of the selected target patch area may be outside of the damaged, or corrupted, region. In one implementation, a target patch area may be selected according to an onion peel ordering. That is, target patch areas located along an edge of the damaged, or corrupted, region may be selected before target patch areas located closer to a central portion of the damaged region. In another embodiment, a target patch area may be selected based, at least in part, on having a per pixel average confidence level higher than per pixel average confidence levels of other target patch areas. For example, initially, a pixel outside of the damaged, or corrupted, region may have a confidence level of 1 and a pixel inside the damaged, or corrupted, region may have a confidence level of 0. A priority function for selecting a target patch area may be modulated by a presence of strong image gradients. Thus, for example, pixels which lie on a continuation of strong edges may be assigned a higher priority value than other pixels.

The processing device may apply an inverse transformation of the dust model, $D(x)$, to pixels within the damaged, or corrupted, region in order to photometrically recover an estimate of the underlying digital image (act 610).

Next, the processing device may calculate a pixel distance between the selected target patch area, T, and each candidate source patch, S, according to $$d(T, S) = \lambda \sum_{x \in \psi} (T(x) - S(x))^2 + \sum_{x \in \Omega} (T(x) - S(x))^2$$

with $0 < \lambda \leq 1$. In one embodiment, $\lambda$ may have a value of 0.9 (act 612).

One or more candidate source patches may then be selected based on having a smallest pixel distance or pixel distances from among multiple candidate source patches (act 614). For example, if one candidate source patch is selected, the one candidate source patch may be selected based, at least in part, on having a pixel distance smaller than others of the candidate source patches, with respect to the target patch area. If N candidate source patches are selected, the N candidate source patches, collectively, may be selected based on having N of the smallest pixel distances from among the candidates source patches, with respect to the target patch area.

Next, the processing device may restore the selected target patch area based on the selected one or more candidate source patches (act 616). If only one candidate source patch is selected, then pixels of the target patch area, which are included in the damaged, or corrupted, region, may be restored by copying, or cloning, values of the red channel, the green channel, and the blue channel of corresponding pixels of the selected candidate source patch. In an embodiment in which N candidate source patches are selected, the pixels of the target patch area, which are included in the damaged region, may be restored according to $$T'(x) = \Sigma_i S_i(x) \times \omega_i \text{ for each } x \in \psi, \text{ with } i=1, \ldots, N$$

where $T'(x)$ is a restored pixel and $\omega_i$ is a patch-based weight function of a pixel distance $d(T, S_i)$ (the larger the pixel distance, the smaller the weight).

Figure 7:
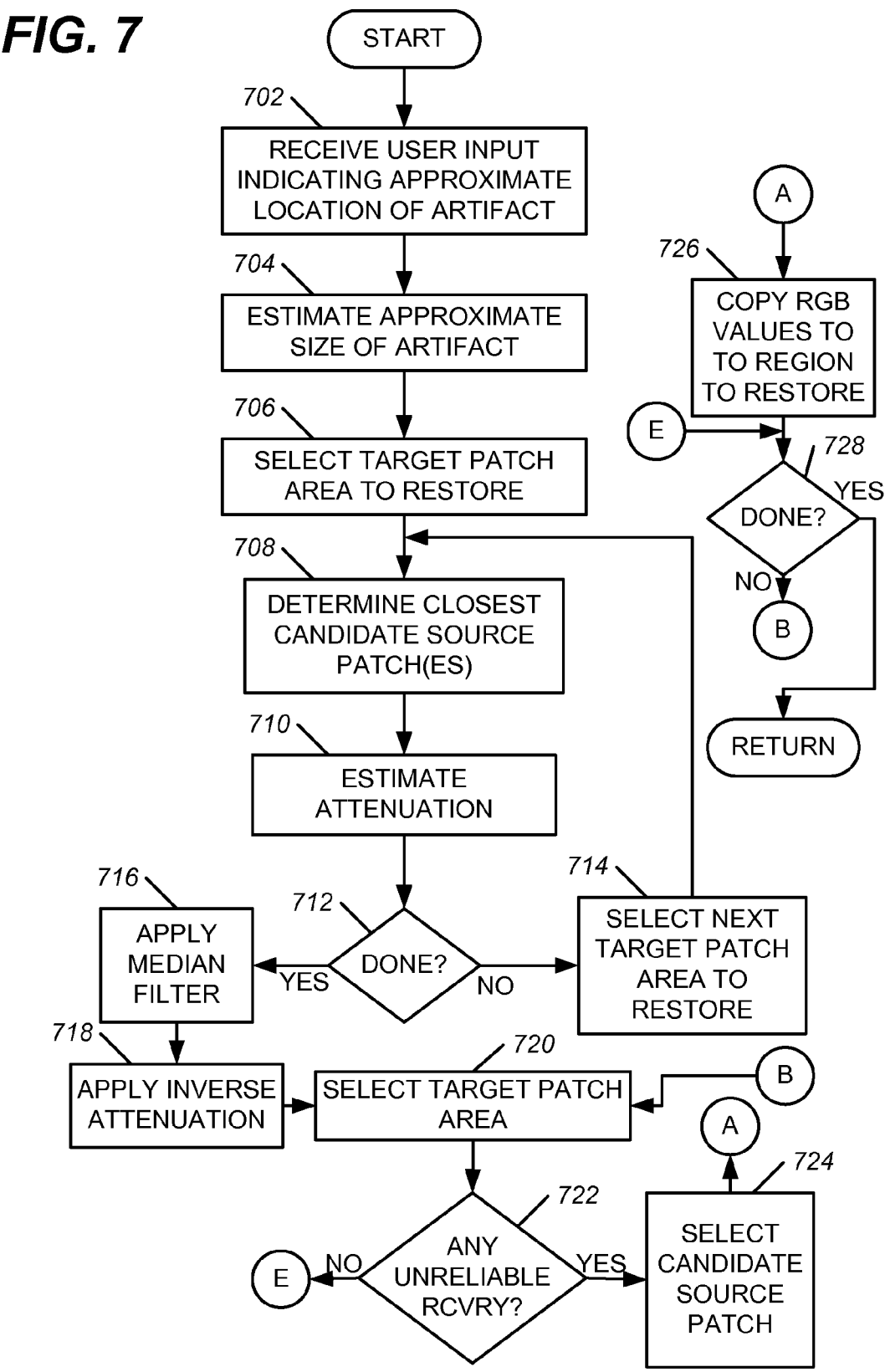

FIG. 7 is a flowchart illustrating an exemplary process which may be implemented in another embodiment consistent with the subject matter of this disclosure. The process may begin with a processing device receiving user-provided input indicating an approximate location of an artifact in a digital image (act 702). The user may provide the input via a pointing device. For example, the user may use a computer mouse to position a cursor over an approximate central portion of the artifact and left click the computer mouse to thereby indicate the approximate location of the artifact, the user may touch, with a finger, a stylus, or an electronic pen a portion of a touchscreen which is displaying the artifact, or via other methods.

Figure 8:
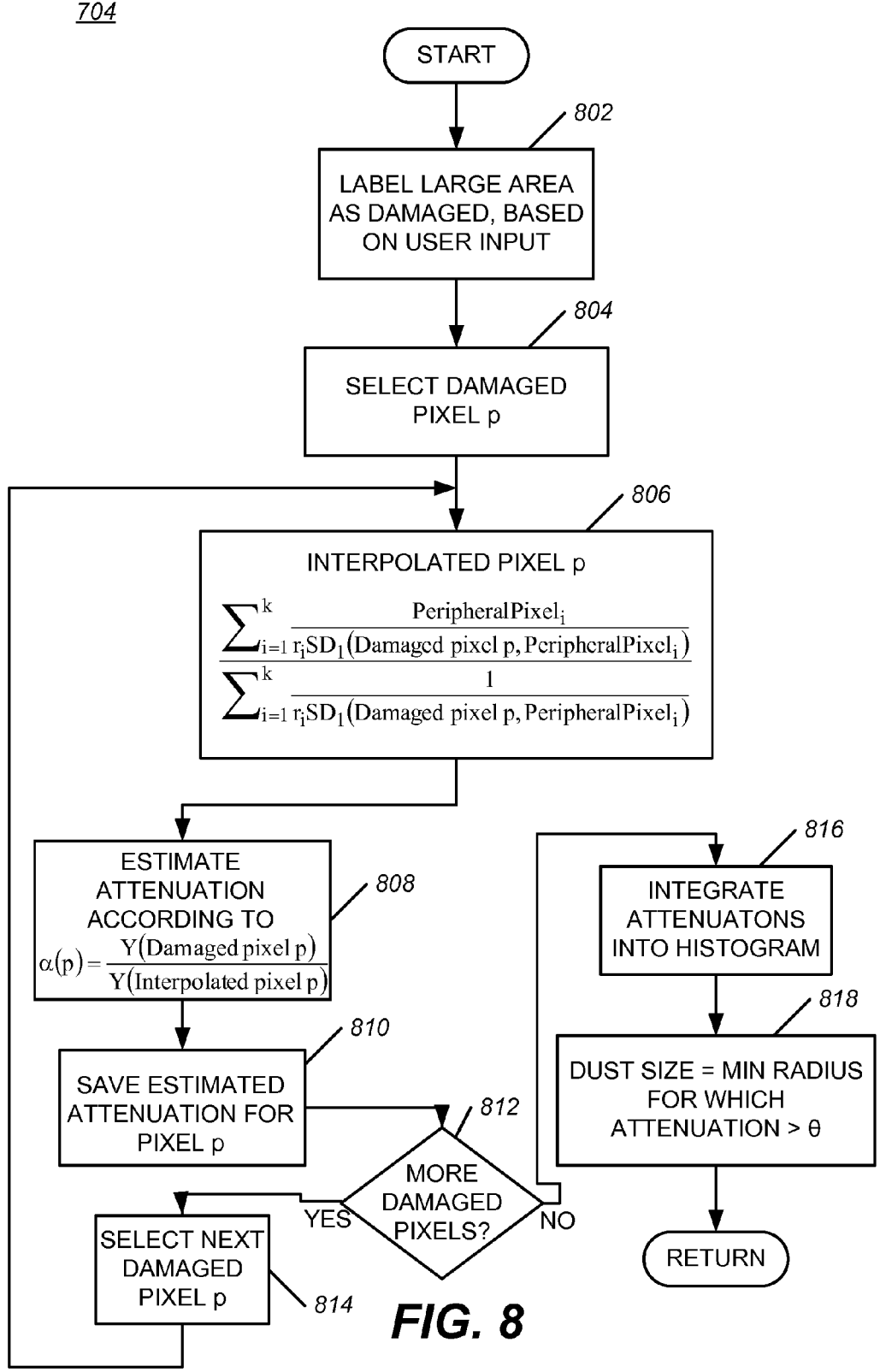

The processing device may then estimate an approximate size of dust or a particle which caused the artifact (act 704). FIG. 8 is a flowchart of an exemplary process for performing act 704 in an embodiment consistent with the subject matter of this disclosure.

The process may begin with the processing device labeling a large area as damaged, based on the user input which provides the approximate location of the artifact (act 802). For example, the large area may be a circular area having a 60 pixel radius or another suitable size. Next, the processing device may select a damaged pixel p from the damaged large area (act 804). The processing device may then interpolate the damaged pixel p according to $$\frac{\sum_{i=1}^{k} \frac{PeripheralPixel_i}{r_i SD_1(\text{Damaged pixel } p, PeripheralPixel_i)}}{\sum_{i=1}^{k} \frac{1}{r_i SD_1(\text{Damaged pixel } p, PeripheralPixel_i)}}$$

where k is a number of undamaged reference pixels on a boundary of the damaged area, $PeripheralPixel_i$ refers to an $i^{th}$ undamaged reference pixel, $r_i$ is a distance from the damaged pixel p to the $i^{th}$ undamaged reference pixel, and $SD_1$(Damaged pixel p, $PeripheralPixel_i$) is a pixel distance formula defined as $$(C_{rg1}-C_{rg2})^2+(C_{rb1}-C_{rb2})^2+(C_{gb1}-C_{gb2})^2+\lambda(D_{y1}-D_{y2})^2$$

where a subscript of 1 refers to the damaged pixel p, a subscript of 2 refers to an undamaged reference pixel, $\lambda$ is a weighting coefficient, $C_{rg}=(R^\beta-G^\beta)/(R^\beta+G^\beta)$, $C_{gb}=(G^\beta-B^\beta)/(G^\beta+B^\beta)$, $C_{rb}=(R^\beta-B^\beta)/(R^\beta+B^\beta)$, R, G and B correspond to red, green and blue channels, respectively, $\beta$ is either 1 or 2, $$D_y = \frac{(Y^\beta - \hat{Y}^\beta)}{(Y^\beta + \hat{Y}^\beta)},$$

Y is luminance and equals $\sqrt{(R^2+G^2+B^2)}$, or Y may be calculated according to Y=0.299R+0.587G+0.114B, and $\hat{Y}$ is a local average of Y (act 806).

According to the interpolation formula, surrounding pixels that are color-consistent with dust-attenuation content receive a much higher weighting coefficient than other pixels.

The processing device may then estimate attenuation of the pixel p, $\alpha(p)$, according to $$\frac{Y(\text{Damaged pixel } p)}{Y(\text{Interpolated pixel } p)},$$

where Y(Damaged pixel p) is luminance of the damaged pixel p and Y(Interpolated pixel p) is luminance of the interpolated pixel p (act 808). The estimated attenuation for pixel p, $\alpha(p)$, may then be saved (act 810).

The processing device may then determine whether there are any additional damaged pixels in the large area to interpolate (act 812). If there are any additional damaged pixels to interpolate, then the processing device may select a next damaged pixel p in the large area (act 814) and acts 806-810 may again be performed.

If, during act 812, the processing device determines that there are no additional damaged pixels to interpolate, then the attenuations may be integrated into a histogram according to a corresponding pixel's distance from a central portion of the large area (act 816). The processing device may estimate a dust size as a minimum radius, from a central portion of the large area, for which attenuation is greater than $\theta$(act 818). In some embodiments, $\theta$ may be set to 0.99. In other embodiments, $\theta$ may be set to a different value.

Returning to FIG. 7, the processing device may select a target patch area to restore from among multiple candidate target patch areas (act 706). In some embodiments, target patch areas may be selected in a priority order based, at least in part, on a per pixel average confidence level of pixels in the target patch areas. For example, a target patch area may be selected based on having a higher per pixel priority than other target patch areas. The target patch area may be on a "restored-damaged" boundary. For example, a portion of a selected target patch area may include at least part of a damaged, or corrupted, region, $\psi$, and a remaining portion, $\Omega$, of the selected target patch area may be outside of the damaged, or corrupted, region.

Per pixel priority may be calculated according to C(p)D(p), where C(p) is a confidence level of a pixel p in a target patch area and D(p) is a gradient of the pixel p in the target patch area. D(p) is a function of a strength of isophotes hitting a target front (boundary fringe) at each iteration. D(p) is defined as a gradient of a signal in a direction parallel to the front. The confidence level C(p) is a measure of an amount of reliable information surrounding pixel p. The confidence level is an average of confidence levels of all pixels in a considered patch neighborhood. Pixels outside the damaged region have an initial (and maximal) confidence level of 1 and pixels inside the damaged, "unrestored" region have an initial confidence of 0. Confidence levels of restored pixels may then be iteratively deduced during patch application. The confidence levels of the restored pixels may be set equal to the average confidence levels of neighboring pixels within a considered target patch. See Criminisi et al., "*Region filling and object removal by exemplar-based image inpainting*," Image Processing, IEEE Transactions on, vol. 13, no. 9, pp. 1200-1212, September 2004. In some embodiments, when the dust attenuation is low (for example, less than a particular threshold), then the priority of the pixel may be calculated according to C(p)D(p)$\alpha$(p), where $\alpha$(p) is an estimated dust attenuation of the pixel. Because D(p) may be zero, in some embodiments, per pixel priority may be calculated according to C(p)(D(p)+epsilon), where epsilon may have a small value.

After selecting the target patch area, the processing device may determine at least one candidate source patch from a number of candidate source patches having a closest or smallest pixel distance(s) with respect to the target patch area (act 708). Any of the following pixel distance formulas may be used to determine the pixel distance:

$$(1-\delta) \sum_{\substack{pixel1 \in targetpatcharea(already\_filled) \\ pixel2 \in sourcepatcharea}} (SD_0(\text{pixel1, pixel2})) + \quad \text{(Dist1)}$$

$$\delta \sum_{\substack{pixel1 \in targetpatcharea \\ (not\_counted\_in\_previous\_\Sigma) \\ pixel2 \in sourcepatcharea}} (SD_1(\text{pixel1, pixel2}))$$

OR $$(1-\delta) \sum_{\substack{pixel1 \in targetpatcharea(already\_filled) \\ pixel2 \in sourcepatcharea}} (SD_0(\text{pixel1, pixel2})) + \quad \text{(Dist2)}$$

$$\delta \sum_{\substack{pixel1 \in targetpatcharea \\ (not\_counted\_in\_previous\_\Sigma) \\ pixel2 \in sourcepatcharea}} \gamma(\text{pixel1}) SD_1(\text{pixel1, pixel2})$$

where $\delta$ is a normalization constant and a weighting coefficient and $\gamma(\text{pixel1})$ is a weighting coefficient that favors undamaged pixels. In some embodiments, $\gamma(\text{pixel1})$ may be a luminance of pixel1. $SD_0(\text{pixel1, pixel2})$ may be determined according to $$(R_1-R_2)^2 + (G_1-G_2)^2 + (B_1-B_2)^2 \quad \text{(Dist3)}$$

where R, G, B refer to values of the red channel, the green channel, and the blue channel, respectively. A subscript of 1 refers to pixel 1 and a subscript of 2 refers to pixel 2. $SD_1$(pixel1, pixel2) may be determined according to the following formula:

$$(C_{rg1} - C_{rg2})^2 + (C_{rb1} - C_{rb2})^2 + (C_{gb1} - C_{gb2})^2 + \lambda(D_{y1} - D_{y2})^2 \quad \text{(Dist4)}$$

$$\text{where } C_{rg} = \frac{(R^\beta - G^\beta)}{(R^\beta + G^\beta)}, \ C_{rb} = \frac{(R^\beta - B^\beta)}{(R^\beta + B^\beta)},$$

$$G_{gb} = \frac{(G^\beta - B^\beta)}{(G^\beta + B^\beta)},$$

$\beta$ is either 1 or 2, and $D_y = \frac{(Y^\beta - \hat{Y}^\beta)}{(Y^\beta + \hat{Y}^\beta)},$ or $D_y = \frac{Y}{\hat{Y}}$, Y is luminance, $\hat{Y}$ is a local average of Y, and $\lambda$ is a weighting coefficient.

Figure 9:
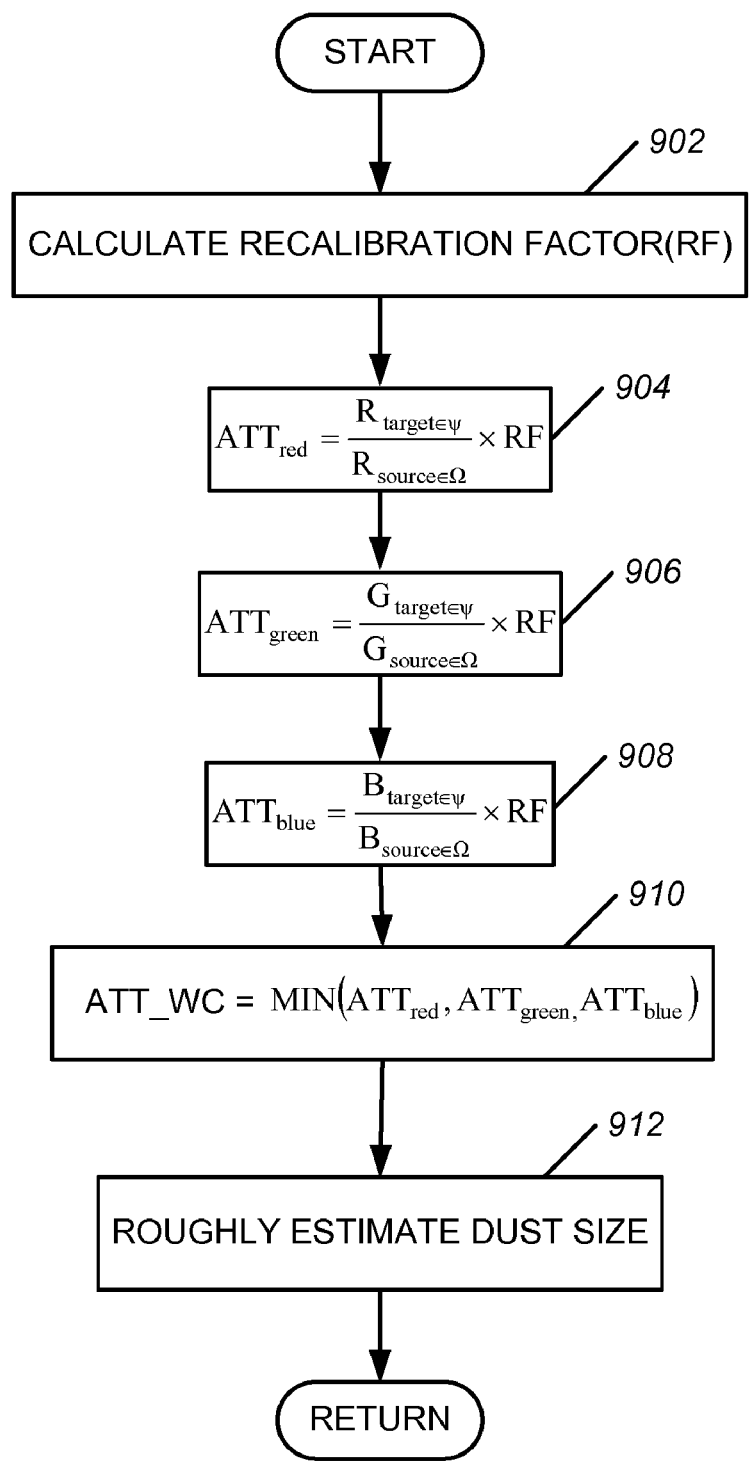

Next, the processing device may estimate attenuation for the damaged pixels in the target patch area and a dust size (act 710). FIG. 9 is a flowchart illustrating exemplary processing for performing act 710 in an embodiment consistent with the subject matter of this disclosure.

The process may begin with the processing device calculating a recalibration factor (RF) (act 902). The recalibration factor may be calculated according to $$RF = \frac{\hat{Y}_{source \in \Omega}}{\hat{Y}_{target \in \Omega}}.$$

That is, the recalibration factor (RF) is equal to an average luminance of pixels in a non-dust-attenuated region of the at least one selected candidate source patch divided by an average luminance of pixels in a non-dust-attenuated region of the target patch area (act 902). The processing device may then calculate attenuation (Att) of a red channel according to $$Att_{red} = \frac{R_{target \in \psi}}{R_{source \in \Omega}} \times RF (\text{act } 904),$$

$$Att_{green} = \frac{G_{target \in \psi}}{G_{source \in \Omega}} \times RF (\text{act } 906),$$

and $$Att_{blue} = \frac{B_{target \in \psi}}{B_{source \in \Omega}} \times RF,$$

where $R_{target \in \psi}$ refers to a red channel value of a pixel in a damaged target area, $G_{target \in \psi}$ refers to a green channel value of a pixel in the damaged target area, $B_{target \in \psi}$ refers to a blue channel value of a pixel in the damaged target area, $R_{source \in \Omega}$ refers to a red channel value of a pixel in an undamaged source patch, $G_{source \in \Omega}$ refers to a green channel value of a pixel in the undamaged source patch, and $B_{source \in \Omega}$ refers to a blue channel value of a pixel in the undamaged source patch (act 908). Attenuation worst-case may be calculated according to: Att_wc=min(Att$_{red}$, Att$_{green}$, Att$_{blue}$) (act 910). Ideally attenuation is equal to Att_wc. If this is not true, the estimated attenuation may be considered suspicious.

The processing device may then roughly estimate a dust size by using traditional $2^{nd}$ order statistics, such as, for example, variance and standard deviation of a dust attenuation distribution (act 912).

When more than one candidate source patch is selected during act 708, such as, for example, N candidate source patches, where N is an integer greater than or equal to 2, N of the candidate source patches having N smallest pixel distances, with respect to the target patch area, may be selected. To estimate a damaged signal in the target patch area, an average of the selected N candidate source patches may be used. Each pixel of the N selected candidate source patches may contribute to a final attenuation estimate with respective weights inversely proportional to a pixel distance, as defined by distance formula Dist2, above, multiplied by a geometrical distance to the target patch area (the closer a candidate source patch is to the target patch area, the greater the weight).

Returning to FIG. 7, the processing device may then determine whether an attenuation has been estimated for all of the damaged pixels in the digital image (act 712). If not, then a next target patch area to restore may be selected in a same manner as was done during act 706 (act 714). Acts 708-712 may then be repeated.

If, during act 712, the processing device determines that an attenuation has been estimated for all of the damaged pixels in the digital image, then the processing device may apply a median filter to improve the attenuation field by filtering out most high-pass signals while preserving possible sharp contours (act 716). A size of the median filter is proportional to the estimated dust size.

Next, the processing device may apply an inverse attenuation to regions having a low dust attenuation and a good signal-to-noise ratio to photometrically adjust the damaged pixels (act 718). In some embodiments, a low dust attenuation and a good signal-to-noise ratio may be assumed where the improved attenuation is greater than a threshold, such as, for example, 0.5, or another suitable value. The dust attenuation may be considered unrecoverable where attenuation $\alpha$<threshold, or where luminance recovered by applying the inverse attenuation differs too much from the dust-attenuated luminance, such as, for example, where:

$$\left|\frac{Y}{\text{attenuation}} - Y\right| > threshold_2.$$

The damaged pixels may be considered unreliable when applying an inverse attenuation would result in an attenuation α that differs too much from luminance recovered using "Att_wc". That is, inverse attenuation may not be applied to recover damaged pixels when $$\left|\frac{Y}{\text{attenuation}} - \frac{Y}{\text{Att\_wc}}\right| > threshold_3.$$

In the above formulas, Y may be calculated according to 0.299R+0.587G+0.114B.

The processing device may then select a target patch area, beginning initially with a first target patch area selected during act 706, and subsequently may select target patch areas in a priority order (act 720). The processing device may then determine whether the selected target patch area has a region labeled as unreliably recovered (act 722).

If the selected target patch area does include a region labeled as unreliably recovered, then the processing device may select a single candidate source patch based on having a shortest pixel distance, with respect to the selected target patch area, according to $$(1-\delta) \sum_{\substack{pixel1 \in targetpatcharea\ (already\_filled) \\ pixel2 \in sourcepatcharea}} (SD_0(pixel1, pixel2)) +$$

$$\delta \sum_{\substack{pixel1 \in targetpatcharea \\ (not\_counted\_in\_previous\_\Sigma) \\ pixel2 \in sourcepatcharea}} \gamma(pixel1) \cdot SD_0(pixel1, pixel2\_recovered\_by\_inversion)$$

(act 724). The processing device may then restore damaged pixels by copying, or cloning, the values of the red channel, the green channel, and the blue channel from pixels in the selected single candidate source patch to corresponding damaged pixels in the selected target patch area (act 726).

The processing device may then determine whether all damaged pixels of the digital image have been restored (act 728). If all of the damaged pixels of the digital image have not been restored, then act 720 may again be performed to select a next target patch area. Otherwise, the process may be completed.

If, during act 722, the processing device determines that the selected target patch area does not have a region labeled as unreliably recovered, then the applying of the inverse attenuation during act 718 has already restored the target patch area and the processing device may then determine whether all damaged pixels of the digital image have been restored (act 728), as previously described.

Figure 10:
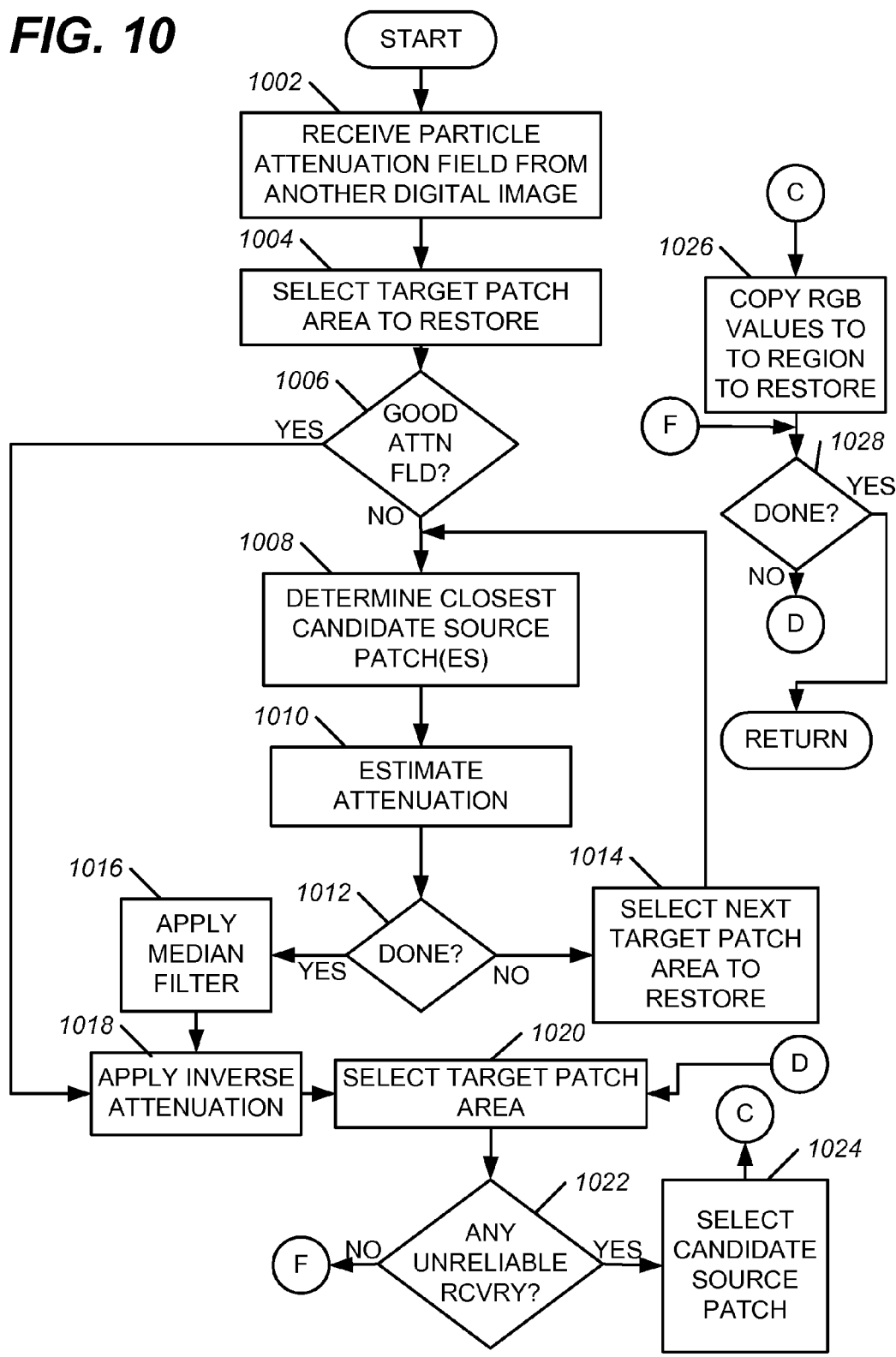

FIG. 10 is a flowchart of an exemplary process which may be implemented in a different embodiment consistent with the subject matter of this disclosure. In this embodiment, the processing device may attempt to use an attenuation field of an other digital image captured by a same processing device as a current digital image.

The process may begin with receiving, or obtaining an attenuation field of the other digital image (act 1002). The processing device may then select a target patch area to restore in a same manner as was done during act 706 (act 1004). The processing device may then determine whether the attenuation field is a good attenuation field (act 1006). The processing device may determine that the attenuation field is a good attenuation field based on pixel recovery performance for the other digital image, or via another method.

Acts 1008-1028 may be identical to act 708-728 of FIG. 7 and will not be discussed further. If, during act 1006, the processing device determines that the attenuation field is not a good attenuation field, then acts 1008-1028 may be performed. Otherwise, the processing device may skip acts 1008-1016 and may perform act 1018 to attempt to recover damaged pixels by applying inverse attenuation.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIGS. 6-10 may be different, may be performed in a different order, and/or may include additional or other acts. Accordingly, the appended claims and their legal equivalents define embodiments, rather than any specific examples given.

We claim as our invention:

1. A method for removing an artifact from a digital image, the method comprising:
    estimating, by a processing device, an attenuation of a plurality of pixels of the digital image;
    applying, by the processing device, an inverse transformation, based on the estimated attenuation, to a plurality of pixels in a corrupted region including the artifact;
    selecting, by the processing device, a target patch area, such that a first plurality of pixels of the target patch area are outside of the corrupted region and a second plurality of pixels of the target patch area are inside the corrupted region;
    determining, by the processing device, a pixel distance between the target patch area and each of a plurality of candidate source patch areas outside of the corrupted region such that ones of the second plurality of pixels within the target patch area are considered when determining the pixel distance;
    selecting, by the processing device, at least one of the plurality of candidate source patches based on the determined pixel distance; and
    restoring, by the processing device, the second plurality of pixels of the target patch area based on corresponding pixels of the selected at least one of the plurality of candidate source patches.

2. The method of claim 1, wherein:
    the selecting of at least one of the plurality of candidate source patches comprises selecting one of the plurality of candidate sources patch having a smallest pixel distance with respect to the target patch area, and
    the restoring of the second plurality of pixels of the target patch area further comprises copying corresponding ones of a plurality of pixels of the selected one of the plurality of candidate source patches to the second plurality of pixels of the target patch area.

3. The method of claim 1, further comprising:
selecting, by the processing device, an order for restoring a plurality of target patch areas based, at least in part, on an average per pixel confidence level of all pixels in respective ones of the plurality of target patch areas.

4. The method of claim 1, wherein the determining of a pixel distance between the target patch area and each of the plurality of candidate source patch areas comprises:
calculating, by the processing device, the pixel distance between the target patch area and a respective one of the plurality of candidate source patches according to $$(1-\delta) \sum_{\substack{pixel1 \in \text{ target patch area} \\ pixel2 \in \text{ candidate source patch}}} ((R_1 - R_2)^2 + (G_1 - G_2)^2 + (B_1 - B_2)^2) +$$

$$\delta \sum_{\substack{pixel1 \in \text{ target patch area} \\ (\text{and not already counted in} \\ \text{previous summation term}) \\ pixel2 \in \text{ candidate source patch}}} \left( \begin{array}{c} (C_{rg1} - C_{rg2})^2 + (C_{rb1} - C_{rb2})^2 + \\ (C_{gb1} - C_{gb2})^2 + \lambda(D_{y1} - D_{y2})^2 \end{array} \right)$$

where a subscript of 1 refers to pixel 1, a subscript of 2 refers to pixel 2, $\delta$ is a normalization constant as well as a weighting coefficient, $\lambda$ is a weighting coefficient, $C_{rg}=(R^\beta-G^\beta)/(R^\beta+G^\beta)$, $C_{rb}=(R^\beta-B^\beta)/(R^\beta+B^\beta)$, $C_{gb}=(G^\beta-B^\beta)/(G^\beta+B^\beta)$, R, G and B correspond to red, green and blue channels, respectively, $\beta$ is either 1 or 2, $$D_y = \frac{(Y^\beta - \hat{Y}^\beta)}{(Y^\beta + \hat{Y}^\beta)},$$

Y is luminance and equals $\sqrt{(R^2+G^2+B^2)}$, and $\hat{Y}$ is a local average of Y.

5. The method of claim 1, wherein the determining of a pixel distance between the target patch area and each of the plurality of candidate source patch areas comprises:
calculating, by the processing device, the pixel distance between the target patch area and a respective one of the plurality of candidate source patches according to $$(1-\delta) \sum_{\substack{pixel1 \in \text{ target patch area} \\ pixel2 \in \text{ candidate source patch}}} ((R_1 - R_2)^2 + (G_1 - G_2)^2 + (B_1 - B_2)^2) +$$

$$\delta \sum_{\substack{pixel1 \in \text{ target patch area} \\ (\text{and not already counted in} \\ \text{previous summation term}) \\ pixel2 \in \text{ candidate source patch}}} \gamma(\text{pixel } 1) \left( \begin{array}{c} (C_{rg1} - C_{rg2})^2 + (C_{rb1} - C_{rb2})^2 + \\ (C_{gb1} - C_{gb2})^2 + \lambda(D_{y1} - D_{y2})^2 \end{array} \right)$$

where a subscript of 1 refers to pixel 1, a subscript of 2 refers to pixel 2, $\delta$ is a normalization constant and a weighting coefficient, $\lambda$ is a weighting coefficient, $\gamma$ (pixel1) is a weighting coefficient that favors uncorrupted pixels, $C_{rg}=(R^\beta-G^\beta)/(R^\beta+G^\beta)$, $C_{rb}=(R^\beta-B^\beta)/(R^\beta+B^\beta)$, $C_{gb}=(G^\beta-B^\beta)/(G^\beta+B^\beta)$ R, G and B correspond to red, green and blue channels, respectively, $\beta$ is either 1 or 2, $$D_y = \frac{(Y^\beta - \hat{Y}^\beta)}{(Y^\beta + \hat{Y}^\beta)},$$

R, G and B correspond to red, green and blue channels, respectively, Y is luminance and equals $\sqrt{(R^2+G^2+B^2)}$, and $\hat{Y}$ is a local average of Y.

6. The method of claim 5, wherein the $\gamma$ (pixel1) is equal to a luminance of the pixel 1.

7. The method of claim 1, further comprising:
receiving, by the processing device, a user input indicating a location of an artifact within the digital image;
labeling, by the processing device, a circular area including the indicated location as being potentially damaged;
interpolating, by the processing device, a damaged pixel of a plurality of pixels within the circular area to produce an interpolated pixel according to:

$$\frac{\sum_{i=1}^{k} \frac{PeripheralPixel_i}{r_i SD_1 (\text{Damaged Pixel, Peripheral } Pixel_i)}}{\sum_{i=1}^{k} \frac{1}{r_i SD_1 (\text{Damaged Pixel, Peripheral } Pixel_i)}}$$

where Peripheral Pixel$_i$ is an $i^{th}$ reference pixel on a boundary of the circular area, k is a number of reference pixels on the boundary of the circular area being used interpolate the damaged pixel, $r_i$ is a geometric distance from the damaged pixel to the $i^{th}$ reference pixel, and
SD$_1$ (Damaged Pixel, Peripheral Pixel$_i$)= $(C_{rg(Damaged\ Pixel)}-C_{rg(Peripheral\ Pixel_i)})^2$+ $(C_{rb(Damaged\ Pixel)}-C_{rb(Peripheral\ Pixel_i)})^2$+ $(C_{gb(Damaged\ Pixel)}-C_{gb(Peripheral\ Pixel_i)})^2$+ $\lambda(D_{y(Damaged\ Pixel)}-D_y(\text{Peripheral Pixel}_i))^2$
where $C_{rg}=(R^\beta-G^\beta)/(R^\beta+G^\beta)$, $C_{rb}=(R^\beta-B^\beta)/(R^\beta+B^\beta)$, $C_{gb}=(G^\beta-B^\beta)/(G^\beta+B^\beta)$, $\beta$ is either 1 or 2, $$D_y = \frac{(Y^\beta - \hat{Y}^\beta)}{(Y^\beta + \hat{Y}^\beta)},$$

or $$D_y = \frac{Y}{\hat{Y}},$$

Y is luminance, $\hat{Y}$ is a local average of the Y, $\lambda$ is a weighting coefficient, and R, G and B correspond to red, green and blue channels, respectively; and
estimating, by the processing device, a dust attenuation of the damaged pixel by dividing a luminance of the damaged pixel by a luminance of a corresponding interpolated pixel.

8. The method of claim 1, further comprising:
applying, by the processing device, the inverse transformation to ones of the plurality of pixels in the corrupted region when the estimated attenuation is greater than a first predefined threshold; and
not applying, by the processing device, the inverse transformation to the ones of the plurality of pixels in the corrupted region when the estimated attenuation is less than a second predefined threshold.

9. A processing device comprising:
a processor; and
a memory connected to the processor, the memory further comprising:
instructions for estimating an attenuation of a plurality of pixels in a corrupted region of a digital image, the corrupted region including an artifact,
instructions for applying an inverse transformation, based on the estimated attenuation, to ones of the plurality of pixels in the corrupted region,
instructions for selecting a target patch area including at least some of the plurality of pixels of the corrupted region, the selected target patch area being based, at least in part, on having a highest per pixel average confidence level of all pixels included in the target patch area in comparison to a per pixel average confidence level of all pixels of each of a plurality of other target patch areas,
instructions for determining a pixel distance between the selected target patch area and each of a plurality of candidate source patch areas outside of the corrupted region, such that ones of the plurality of pixels in the corrupted region that are included in the target patch area are considered when determining the distance,
instructions for selecting at least one of the plurality of candidate source patches based on the determined distances,
instructions for restoring ones of a plurality of pixels of the target patch area that are included in the corrupted region based on corresponding pixels of the selected at least one of the plurality of candidate source patches, and
instructions for selecting a next target patch area, based, at least in part, on having a highest per pixel average confidence level of all pixels included in the target patch area in comparison to a per pixel average confidence level of all pixels of each remaining one of a plurality of other target patch areas.

10. The processing device of claim 9, wherein the memory further comprises:
instructions for receiving a single click of a pointing device indicating a location of a portion of the artifact in the digital image,
instructions for labeling, by the processing device, an area, including the location of the portion of the artifact as being potentially damaged;
instructions for interpolating, by the processing device, each of a plurality of damaged pixels, within the area, to produce respective interpolated pixels based, at least in part, on a plurality of reference pixels on a boundary of the area and a geometric distance from each of a plurality of damaged pixels to each of the plurality of pixels on the boundary of the area,
instructions for estimating an attenuation of each of the plurality of damaged pixels by dividing a luminance of each of the plurality of damaged pixels by a luminance of a corresponding one of a plurality of interpolated pixels,
instructions for calculating an average attenuation for each radius from the center of the circular area to each of the plurality of damaged pixels, and
instructions for estimating a dust size as a minimal radius for which the average attenuation is greater than a predetermined value.

11. The processing device of claim 10, wherein the predetermined value is 0.99.

12. The processing device of claim 9, wherein the instructions for estimating an attenuation of a plurality of pixels of a digital image further comprise:
instructions for calculating a recalibration factor by dividing an average luminance of a plurality of pixels of the selected at least one of the plurality of candidate source patches by an average luminance of a plurality of pixels over a non-attenuated region of the selected target patch area,
instructions for calculating an attenuation of each of a red channel, a green channel, and a blue channel of a damaged pixel in the selected target patch area according to $$Att_{red} = \frac{R_{target \in \psi}}{R_{source \in \Omega}} \times RF,$$

$$Att_{green} = \frac{G_{target \in \psi}}{G_{source \in \Omega}} \times RF,$$

and $$Att_{blue} = \frac{B_{target \in \psi}}{B_{source \in \Omega}} \times RF,$$

where $Att_{red}$, $Att_{green}$, and $Att_{blue}$, refer to the attenuation of the red channel, green channel and blue channel, respectively, $R_{target \in \psi}$ refers to a red channel value of a pixel in a damaged target area, $G_{target \in \psi}$ refers to a green channel value of a pixel in the damaged target area, $B_{target \in \psi}$ refers to a blue channel value of a pixel in the damaged target area, $R_{source \in \Omega}$ refers to a red channel value of a pixel in an undamaged source patch, $G_{source \in \Omega}$ refers to a green channel value of a pixel in the undamaged source patch, and $B_{source \in \Omega}$ refers to a blue channel value of a pixel in the undamaged source patch, RF is the recalibration factor and the undamaged source patch is the at least one selected plurality of candidate source patch areas,
instructions for estimating an attenuation of a pixel in the corrupted region according to $$Attenuation_{pixel-in-target-region} = \left( \frac{\text{Luminance of the pixel in the corrupted region}}{\begin{array}{c}\text{Luminance of a corresponding pixel} \\ \text{in the undamaged source patch}\end{array}} \right)(RF),$$

instructions for determining a worst-case attenuation according to $Attenuation_{worst-case} = \min(Att_{red}, Att_{green}, Att_{blue})$, and
instructions for determining that the estimated attenuation of the pixel in the corrupted region is suspicious when the estimated attenuation of the pixel in the target region is not equal to the worst-case attenuation, wherein
the instructions for applying an inverse transformation include instructions for recovering a pixel in the target region by attenuation inversion only when a corresponding estimated attenuation is not suspicious.

13. The processing device of claim 12, wherein:
the instructions for selecting at least one of the plurality of candidate source patches based on the determined distance further comprise:
instructions for selecting a predetermined number of the plurality of candidate source patches having determined pixel distances with respect to the target patch area that are smaller than respective determined pixel distances of each of a plurality of other candidate source patches, the memory further comprises instructions for averaging a plurality of pixels of the selected predetermined number of candidate source patches to produce an averaged source patch, and the instructions for estimating an attenuation of a pixel in the corrupted region estimates the attenuation of the pixel in the corrupted region according to $$Attenuation_{pixel\text{-}in\text{-}corrupted\text{-}region} = \left(\frac{\text{Luminance of the pixel in the corrupted region}}{\text{Luminance of a corresponding pixel in average\_source\_patch}}\right)(RF),$$

where the averaged_source_patch refers to the averaged source patch.

14. The processing device of claim 9, wherein the instructions for estimating an attenuation of a plurality of pixels in a target region of a digital image is based on at least one second digital image captured by a same digital image capturing device used to capture the digital image.

15. A tangible machine-readable medium having recorded therein instructions which are executable by a processor, the instructions comprising:

instructions for selecting a target patch area including at least some of a plurality of pixels of a corrupted region including an artifact, a plurality of pixels of the selected target patch area having a highest average per pixel confidence level from among a respective plurality of pixels included in each of a plurality of target patch areas, instructions for determining a pixel distance between the selected target patch area and each of a plurality of candidate source patch areas outside of the corrupted region, such that ones of a plurality of pixels in a portion of a corrupted region that is included in the target patch area, are considered when determining the pixel distance, instructions for selecting a source patch based on at least one of the plurality of candidate source patch areas having the determined pixel distance which is shorter than the determined pixel distances of others of the plurality of candidate source patch areas, instructions for estimating an attenuation caused by dust associated with the artifact, instructions for estimating a size of the dust, instructions for applying a median filter having a size proportional to the estimated size of the dust to produce an improved estimate of attenuation, instructions for applying an attenuation inversion, based on the improved estimate of attenuation, to recover damaged ones of the plurality of pixels in the selected target patch area, instructions for restoring the damaged ones of the plurality of pixels of the target patch area based on corresponding pixels of the selected source patch, and instructions for selecting a next target patch area, a plurality of pixels of the next target patch area based, at least in part, on a highest per pixel average confidence level in comparison to a per pixel average confidence level of a respective plurality of pixels of each of the plurality of target patch areas to be restored.

16. The tangible machine-readable medium of claim 15, wherein the selected source patch is based, at least in part, on having a shortest one of the determined pixel distances with respect to the selected target patch area.

17. The tangible machine-readable medium of claim 15, wherein the source patch is based, at least in part, on an average of a predetermined number of the plurality of candidate source patches having the predetermined number of shortest ones of the determined pixel distances with respect to the target patch area.

18. The tangible machine-readable medium of claim 15, wherein the attenuation inversion is applied when the improved estimate of attenuation is greater than a predetermined threshold.

19. The tangible machine-readable medium of claim 18, wherein the predetermined threshold is 0.5.

20. The tangible machine-readable medium of claim 15, wherein the instructions for restoring the damaged ones of the plurality of pixels of the target patch area based on corresponding pixels of the selected source patch comprise:

instructions for recovering the damaged ones of the plurality of pixels of the target area by cloning R, G, B values of the corresponding pixels of the selected source patch.

* * * * *